United States Patent [19]

Napolitano et al.

[11] Patent Number: 4,793,266

[45] Date of Patent: Dec. 27, 1988

[54] CAKE DECORATING STAND

[76] Inventors: Vito Napolitano, 5750 N. Octavia, Chicago, Ill. 60631; John DiCataldo, 2914 N. Beulah St., River Grove, Ill. 60171

[21] Appl. No.: 33,727

[22] Filed: Apr. 3, 1987

[51] Int. Cl.[4] .............................................. A47B 11/00
[52] U.S. Cl. ..................................... 108/141; 108/139
[58] Field of Search .................. 108/141, 142, 94, 95, 108/139; 248/405, 406

[56] References Cited

U.S. PATENT DOCUMENTS

| 343,625 | 6/1886 | Davis | 248/405 |
|---|---|---|---|
| 937,755 | 10/1909 | Beatty | 108/139 |
| 1,384,676 | 7/1921 | Rufle | 108/141 |
| 1,407,433 | 2/1922 | Miller | 248/405 X |
| 1,472,348 | 10/1923 | Whittemore | 108/94 |
| 2,519,880 | 8/1950 | Boddy | 108/141 |
| 3,908,565 | 9/1975 | Burnett | 108/94 X |
| 3,910,544 | 10/1975 | Engstrom | 248/405 |
| 4,181,280 | 1/1980 | Bowman | 248/405 |
| 4,334,482 | 6/1982 | Bolduc | 108/94 X |
| 4,572,595 | 2/1986 | Craig | 108/141 X |

FOREIGN PATENT DOCUMENTS

| 1178861 | 5/1959 | France | 108/141 |
|---|---|---|---|
| 124261 | 3/1949 | Sweden | 108/141 |
| 653228 | 12/1985 | Switzerland | 108/95 |

Primary Examiner—Kenneth J. Dorner
Assistant Examiner—José V. Chen
Attorney, Agent, or Firm—Norman Lettvin

[57] ABSTRACT

A stand for aiding a worker, such as a cake decorator, to have selective access from a single work position to all surfaces of the product being worked upon, where the product has multiple tiers of different heights and widths, is provided by a movable product-supporting table that is independently selectively rotatable and/or vertically movable relative to a support for the table. Structure is provided whereby the support table is selectively rotatable about a vertical axis and provides selective vertical movement of the table relative to the support.

A simple, selectively manually-actuatable clamp is available to the worker to selectively control whether the product-supporting table will be only rotated about its vertical axis, or will be also movable vertically by selective rotation of the support table.

The stand is mounted on a wheeled dolly which permits moving both the stand, and the product supported thereon, to selected locations.

9 Claims, 1 Drawing Sheet

CAKE DECORATING STAND

FIELD OF THE INVENTION

This invention relates to an implement used in the process of decorating cakes, such as multi-layered or tiered cakes, and particularly, wedding cakes. More specifically, the invention relates to a support stand wherein the position of a platform for supporting a cake during the process of decorating the cake, may be adjusted, both radially and vertically. The position of the platform may be adjusted as to elevation and angular orientation relative to the location of the cake-decorator in order to facilitate the activity of the decorator in effecting cake decoration. The support stand is preferably mounted on a movable dolly.

BACKGROUND OF THE INVENTION

Multi-layered wedding cakes are often elaborately decorated, can weigh up to 200 pounds and, when of circular shape, may have a bottom layer of such great diameter as to make decoration of the multi-layers difficult. It is desirable to provide an inexpensive, yet effective apparatus that supports the cake and is easily manipulable by the cake-decorator for rotation of the cake relative to the decorator and for elevation or lowering of the cake relative to the decorator. Such a cake-supporting apparatus would thereby provide the decorator with easy access to all sections of the cake during the cake-decorating process. It is also desirable to provide the cake-supporting apparatus upon a movable dolly for selective location of the apparatus with the decorated cake thereon.

The instant invention provides a wheeled and handled dolly upon which is mounted a table or platform for supporting thereon the cake to be decorated. The dolly is also provided with means readily accessible to the cake-decorator for permitting him to selectively rotate the cake-supporting table and to selectively raise or lower the table. The two selective movements are independent of each other, while using some common elements. The cake-decorator even when located at one position, is provided ready access to all surfaces of the cake through the selective movements referred to.

The invention disclosed herein will be more clearly understood by reference to the drawings accompanying this written disclosure of the invention.

BRIEF DESCRIPTION OF THE DRAWINGS

FIG. 2 also shows, in phantom, a multi-layer cake supported on the platform of the cake decorating stand.

DETAILED DESCRIPTION OF THE INVENTION

Figure 1:
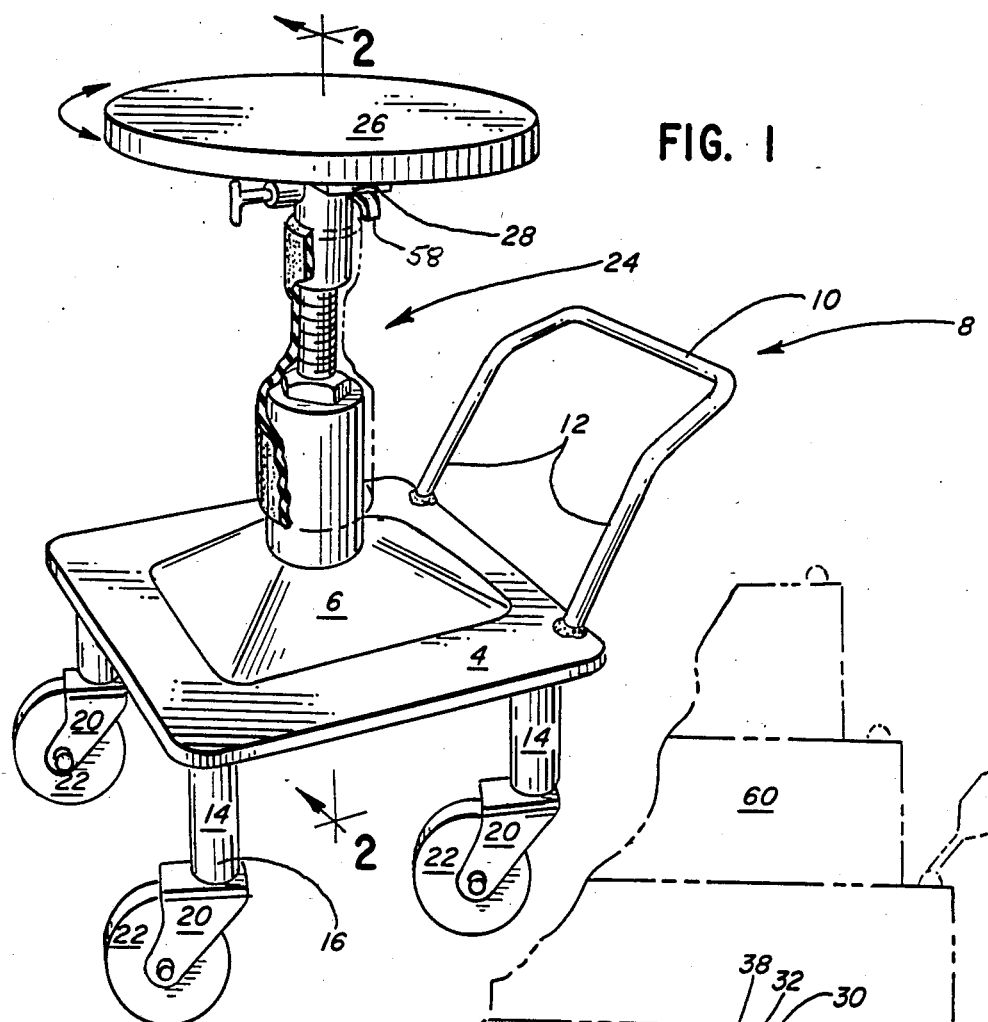
FIG. 1 is a perspective view of one form of apparatus that has been constructed to provide the elements and benefits, referred to generally in the description above.

In FIG. 1, a cake decorating stand, or dolly, is shown generally at 3. The stand 3 includes a rectangular base, or support plate 4, having a central, upwardly dished, frustro-pyramid plate portion 6 which serves in part to rigidify the base plate 4. Attached adjacent one edge of the plate 4, such as by welding or the like, is a U-shaped handle means 8 which projects inclined upwardly and outwardly relative to base plate 4. The handle means 8 provides a hand-graspable handle or bail 10 and two spaced legs 12 which are rigidly connected to the base plate 4 adjacent an edge thereof.

Four sleeve-like legs 14 are attached to the underside of the base plate 4 adjacent its periphery. The legs 14 are constructed to be socketed, at their lower ends 16, to receive into each socket, a caster stem 18 (shown in phantom in FIG. 2). Secured to the lower end of each stem 18 is a U-shaped caster frame 20 which projects below the stem 18 and in which is journalled a wheel, or roller, 22. The wheels 22 are preferably swivel wheels, or casters, which permit the cake decorating dolly 3 to be easily manipulated to a desired attitude and/or to be wheeled into and out of a cooler. The handle 8 provides mean for controlling, moving, and guiding the dolly 3.

An upright, tubular, support shaft means, or table support designated generally at 24, is attached at its lower end to the centrally located, uppermost panel of upwardly dished portion 6. A planar, decorating table or platform 26 is provided spaced above the base plate 4 with a support shaft means 24 interposed between the base plate 4 and the table 26. The decorating table 26 includes a cylindrical disc of wood or an equivalent material.

Figure 2:
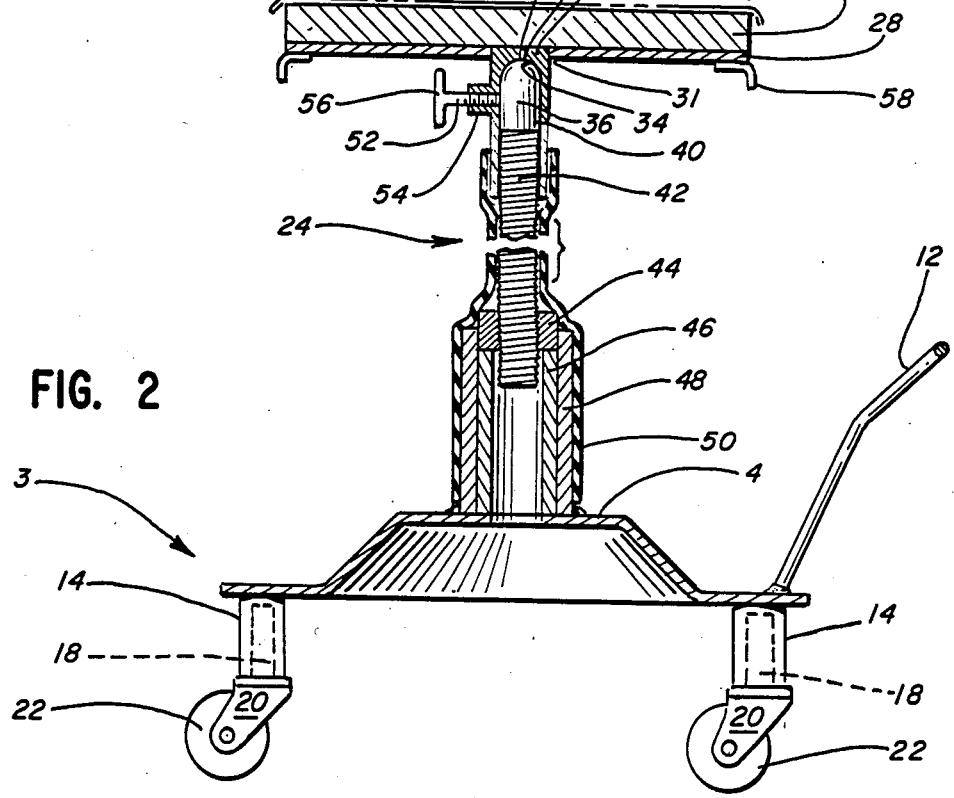
FIG. 2 is a vertical, cross-sectional view of the apparatus of FIG. 1, taken substantially in the direction shown by arrows 2—2.

FIG. 2 shows the cake decorating stand 3 and especially, table support shaft means 24 in greater detail. The decorating table 26, which supports a product, such as a layered cake shown in broken lines, is fastened at its underside to a diametrically extending strap or plate 28. The decorating table 26 may be fastened to and above the strap 28 by any well-known means, including bolts. The strap 28 is secured to a sleeve-like member 30 at the center of the table 26 by any well-known means, usually a peripheral weld 31.

The sleeve 30 is formed with a lower tubular section 40 and an inner, downwardly facing hemispherical socket 32. The socket 32 serves as a smooth journal surface. The socketed sleeve 30 is normally rotatable upon an upper, ball-segment, bearing surface 34 of a pintle shaft 36. The concave shape of the journal surface 32 in part complements that of the bearing surface 34, such that a smooth bearing is formed when the table 26 is supported only upon the convex, bearing surface 34. The journal and bearing surfaces 3 and 34 are rounded in order that most support of the table 26 occurs closest to contact point 38, where the uppermost tip of the pintle shaft 36 contacts the innermost portion of journal socket 32. With such minimal contact there is only a minimum of friction with the result that the table 26 turns freely.

The sleeve 30 also includes a lower, cylindrical extension 40 which surrounds the pintle shaft 36 in slightly spaced relation thereto. The axial extension 40 of the sleeve 30 provides a means by which the sleeve 30 can limit the amount of wobble of the decorating table 26 as table 26 turns on shaft 36. By providing a relatively great amount of cylindrical surface area around the pintle shaft 36, the extension 40 operates to limit the amount of play between the pintle shaft 36 and he extension 40. Therefore, the decorating table 26 turns on the upper end of pintle shaft 36 with almost no rocking motion. The extension 40, at the same time, serves to make rotation of the table 26 on pintle shaft 36 smooth by providing a limited annular space between the extension 40 of sleeve 30 and tee portion of shaft 36 below the pintle tip bearing surface 34.

The pintle shaft, or stem, 36 also has a lower, threaded portion 42. The threaded portion 42 is receivable within the interior threads of nut 44 that is supported in spaced relation to the base 4. Nut 44 is attached, preferably by a weld, to the upper end of a tubular, inner post 46. Both the nut 44, and the inner post 46, are encircled by a tubular outer post 48. The two posts 46 and 48 are secured such as by welding to the base plate 4. Alternatively, post 46 could be welded to outerpost 48 which in turn is secured to base plate 4. A flexible sleeve or cover tube 50 of plastic, or other protective material, encompasses most of the table support shaft 24. The tube 50 keeps flour and other cake ingredients out of the adjustment mechanism.

The upper end of the table support shaft 24 is provided with a selectively operable, locking means comprising a set screw 52 received within the threads of an apertured mounting 54. The outer end of set screw 52 is provided with a handle 56, to facilitate manual turning of the screw 52. When the set screw 52 is tightened against the pintle shaft 36, the upper sleeve 30 will be locked onto the lower section of the smooth, upper surface of pintle shaft 36. When the set screw 52 clamps against pintle shaft 36, the decorating table 26 and the pintle shaft 36 will rotate together causing the threaded section 22 of pintle shaft 36 to move selectively up or down in the threads of nut 44.

Using finger grips, or tabs, 58 to rotate the decorating table 26 clockwise, the lower, threaded portion 42 of pintle shaft 36 will turn into the nut 44. The decorating table 26 will therefore move towards the base plate 4. The height at which a cake 60 is decorated will be decreased. Conversely, using the finger tabs 58 to rotate the decorating table 26 counterclockwise, the lower, threaded portion 42 of pintle shaft 36 will turn out of the nut 44. The decorating table 26 will therefore move away from the base plate 4. And the height at which the cake 60 is decorated will increase.

After the height at which the cake is to be decorated is adjusted, the set screw 52 is loosened. By loosening the set screw 52, the upper sleeve 30 is released from the upper journal surface 34 of pintle shaft 36. The inner bearing surface 32 of upper sleeve 30 becomes freely rotatable upon the journal surface 34. The decorating table 26 is therefore free to spin with respect to pintle shaft 36 and base plate 4.

In this manner, a product being produced, such as a decorated, layered cake, may be decorated while the cake decorator, or worker, remains in the same spot. The decorator locks the table 26 onto pintle shaft 36, using set screw 52. The decorating table 26 is then raised or lowered to an appropriate height by rotating the table 26 using the finger tabs 58. The shaft 36 ordinarily has four threads per inch such that each rotation of the table 26 will raise or lower one-fourth of an inch. However, any other thread configuration may be used as is desired and can be machined.

When the table 26 is at the appropriate height, the set screw 52 is loosened, freeing the upper sleeve 30 from the pintle shaft 36. The baker, or decorator, may now complete the entire layer from the same spot by rotating the released table 26 as the cake 60 is decorated.

When the decorator wishes to go to the next layer, the set screw 52 is tightened and the table 26 rotated until the next layer is decoratable. The set screw 52 is then loosened and the next layer completed. This procedure of: (a) locking set screw 52 and adjusting vertical height; and (b) unlocking screw 52 to freely rotate a layer while decorating, is repeated until the whole cake is finished. Then the dolly 2 may be wheeled into a refrigerator or cooler to be stored until the cake is ready for delivery.

While particular embodiments of the cake decorating dolly have been shown and described, it will be obvious to those of skill in the art that various changes and modifications may be made in the construction without departing from the spirit and scope of the invention. Therefore, it is intended in the appended claims to cover all such changes and modifications which fall within the true spirit and scope of the invention.

What is claimed is:

1. In a rotary table of the type having a planar support platform positioned to be centrally engaged on its underside by the rounded upper terminus of an upright support standard, the standard having a vertically disposed axis about which said support platform is adapted to rotate;

the improvement comprising, in combination:

apertured plate means secured to the bottom side of the support platform;

a downwardly extending, centrally-located, sleeve-like member projecting from the underside of said support platform through said apertured plate means to extend below said plate means to provide a lower tubular section that is integral with an upper section that is shaped to provide a downwardly facing hemispherical socket that is secured to the bottom side of the support platform;

support means for said support platform spaced below said sleeve-like member and including an internally screw-threaded, lower support member, spaced below said centrally -located, sleeve-like member;

an elongated pintle shaft, of a shape and length to extend from a supporting, bearing engagement with the inner-most surface of the downwardly facing hemispherical socket and at least partially through said internally threaded support member that is spaced below the sleeve-like member that is secured to the underside of the support platform;

the pintle shaft having an elongated threaded section for screw connection with said internally screw-threaded support member; and a manually actuatable, handled, set screw, threadedly mounted to extend through an upright wall of said lower tubular section of said sleeve-like member, for either selectively engaging the tubular section to the pintle shaft, so that they will rotate together, or for releasing the pintle shaft, so that the table and the socket may together rotate freely relative to the pintle shaft.

2. The rotary table of claim 1 including a means for selectively effecting vertical adjustment of said support platform, said vertical adjustment means including said threaded section of said pintle shaft being selectively rotatable relative to said internally threaded, lower support member to effectuate selective lowering or raising of said support platform, said support platform being engaged to said pintle shaft by means of pressure engagement of said handled, set screw with a portion of said pintle shaft.

3. The rotary table of claim 1 including a means for permitting rotation of said support platform about said vertically disposed axis at a vertically elevated position, said means which permits such rotation of said support platform including said handled set screw being released from a clamping relation against said pintle shaft, so that said support platform is then released, for free rotation of said platform relative to said pintle shaft.

4. The rotary table of claim 3 including fingertab means provided on said plate means and below said support platform, to provide means to facilitate selective rotation of said support platform about said vertical axis.

5. The rotary table of claim 1 wherein said pintle shaft includes an upper terminus that provides for bearing engagement with the uppermost surface portion of said downwardly facing, hemispherical socket, said pintle terminus including an upwardly facing, convex, hemispherical tip that in part complements said downwardly facing, hemispherical socket.

6. The rotary table of claim 5 wherein said upwardly facing, hemispherical tip contacts said downwardly facing, hemispherical socket at a contact area located at substantially the uppermost portion of said hemispherical tip, and at an innermost portion of said hemispherical socket, to minimize friction between the hemispherical tip and the hemispherical socket.

7. The rotary table of claim 5 wherein said pintle shaft includes a smooth-surfaced cylindrical section located intermediate said hemispherical tip and said threaded section of said pintle shaft.

8. The rotary table of claim 7 wherein said lower, tubular section of said sleeve-like member extends below said plate means in a manner substantially parallel to and spaced from said intermediate section of said pintle shaft so as to surround said intermediate section of said pintle shaft, and to form an annular space between the interior surface of said lower, tubular section of said sleeve-like member and the outer surface of said intermediate section of said pintle shaft.

9. In the cake decorating stand of claim 1, a locking means being provided on said upper sleeve for interconnecting said upper sleeve and said upper, unthreaded, shaft portion, enabling said decorating table and said shaft to rotate in conjunction.

* * * * *